(12) United States Patent
Solberg et al.

(10) Patent No.: US 11,384,453 B2
(45) Date of Patent: Jul. 12, 2022

(54) ELECTRO HYDRODYNAMIC PRODUCTION METHOD AND SYSTEM

(71) Applicant: Innovative Mechanical Engineering Technologies BV, Waalre (NL)

(72) Inventors: Ramon Hubertus Mathijs Solberg, Munstergeleen (NL); Marc Simonet, Eindhoven (NL); Paul Johannes Franciscus Maria Janssen, Eindhoven (NL)

(73) Assignee: Innovative Mechanical Engineering Technologies B.V., Waalre (NL)

( * ) Notice: Subject to any disclaimer, the term of this patent is extended or adjusted under 35 U.S.C. 154(b) by 25 days.

(21) Appl. No.: 16/756,480

(22) PCT Filed: Oct. 19, 2018

(86) PCT No.: PCT/NL2018/050687
§ 371 (c)(1),
(2) Date: Apr. 16, 2020

(87) PCT Pub. No.: WO2019/078719
PCT Pub. Date: Apr. 25, 2019

(65) Prior Publication Data
US 2021/0198809 A1    Jul. 1, 2021

(30) Foreign Application Priority Data
Oct. 19, 2017   (NL) .................................. 2019763

(51) Int. Cl.
*B05B 12/12*    (2006.01)
*B05D 1/04*     (2006.01)
(Continued)

(52) U.S. Cl.
CPC ......... *D01D 5/0092* (2013.01); *B05B 5/0255* (2013.01); *B05D 1/045* (2013.01);
(Continued)

(58) Field of Classification Search
CPC ......... B05B 5/0255; B05B 12/12; B05D 1/04; B05D 1/045; B29C 48/92;
(Continued)

(56) References Cited

U.S. PATENT DOCUMENTS 4,221,185 A * 9/1980 Scholes ..................... B05B 5/14
                                                           118/634
6,004,625 A * 12/1999 Ohshima ................. B05B 5/002
                                                           427/180

(Continued)

FOREIGN PATENT DOCUMENTS

WO         2014189375        11/2014

*Primary Examiner* — Leo B Tentoni
(74) *Attorney, Agent, or Firm* — N.V. Nederlandsch Octrooibureau

(57) ABSTRACT

An improved electro hydrodynamic method is provided. The method comprises arranging (11) an electro hydrodynamic device inside an enclosure and distributing (12) positive and/or negative ions inside the enclosure during a charging period with a certain defined amount of power. The distribution of the positive and/or the negative ions inside the enclosure (20) is performed so that a predefined amount of charge is set on the interior of the enclosure (20). Within a predetermined period of time after the charging period has ended, the electrospinning device is activated so as to create a product. Finally, the product is removed from the device. The present invention offers a solution for the problem of non-identical initial process conditions for an electro hydrodynamic process caused by any electric charges on the equipment.

9 Claims, 7 Drawing Sheets

(51) Int. Cl.
*D01D 5/00* (2006.01)
*B05B 5/025* (2006.01)
*D04H 1/728* (2012.01)
*B29C 48/92* (2019.01)

(52) U.S. Cl.
CPC ........... *B29C 48/92* (2019.02); *D01D 5/0038* (2013.01); *D01D 5/0046* (2013.01); *D01D 5/0061* (2013.01); *D04H 1/728* (2013.01); *B29C 2948/92238* (2019.02); *B29C 2948/92733* (2019.02)

(58) Field of Classification Search
CPC ........... B29C 2948/92238; B29C 2948/92733; D01D 5/0007; D01D 5/0015; D01D 5/0023; D01D 5/0038; D01D 5/0046; D01D 5/0061; D01D 5/0092
USPC ........... 264/40.1, 297.1, 464, 465, 466, 484; 425/135, 174.8 E; 427/8, 458; 118/621, 118/663
See application file for complete search history.

(56) References Cited

U.S. PATENT DOCUMENTS

| | | | |
|---|---|---|---|
| 6,479,820 B1 * | 11/2002 | Singh | G03F 7/40 396/578 |
| 2005/0224999 A1 | 10/2005 | Andrady et al. | |
| 2007/0042069 A1 | 2/2007 | Armantrout et al. | |
| 2009/0224437 A1 * | 9/2009 | Fukuoka | D01D 5/0061 264/465 |

* cited by examiner

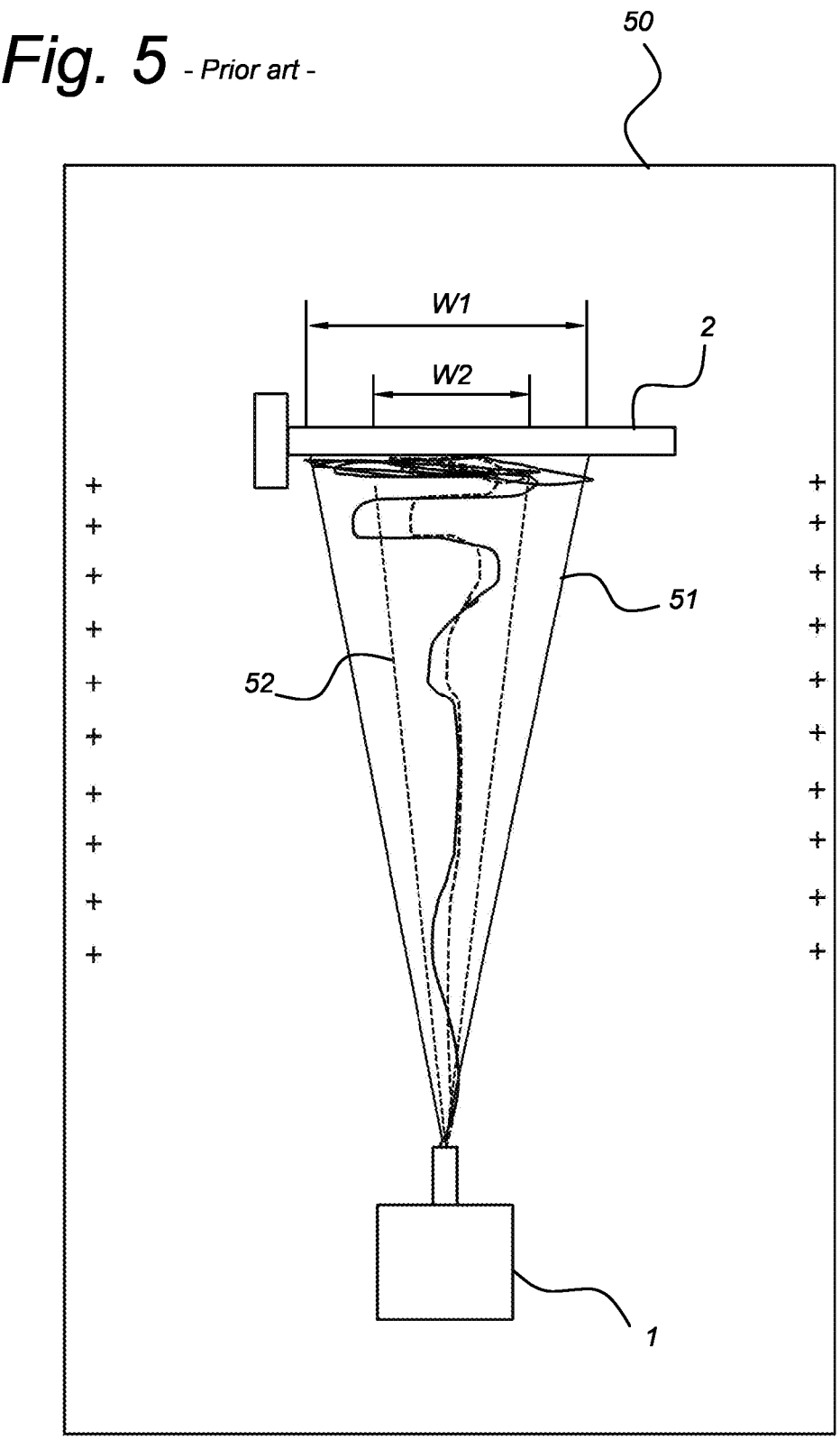
Fig. 5 - Prior art -

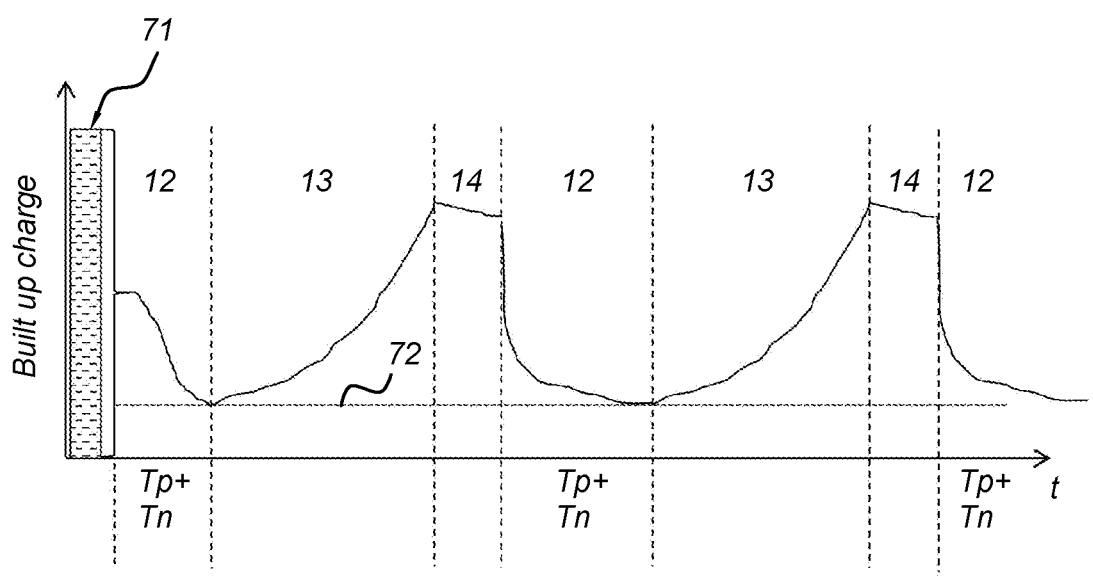

ELECTRO HYDRODYNAMIC PRODUCTION METHOD AND SYSTEM

FIELD OF THE INVENTION

The invention relates to an electro hydrodynamic production method and to a system for performing such a method. More particularly, the invention relates to two specific methods using electro hydrodynamic processes namely electrospinning and electrospraying.

BACKGROUND ART

US patent publication US2005/224999 discloses an electrospinning device for producing fibrous materials. The device has an extrusion element configured to electrospin a substance using an electric field extraction of the substance from a tip of the extrusion element, a collector, and a chamber enclosing the collector and extrusion element. An ion generator is present to generate ions for injection into a Rayleigh instability zone in the chamber during operation of the device.

International patent publication WO2014/189375 discloses a method for depositing a coating material on a medical device using electro-spraying of a coating material. The disclosed method further includes providing ions in the spray chamber to subject a surface to be coated to ions to prevent formation of holes or cracks in the deposited coating material.

Electro hydrodynamic production processes, in particular electrospinning and electrospraying are facile, cost effective and flexible methods that utilize electrically charged jet of polymer solution for the production of fibers or particles at micron, submicron and nanoscale. Electrospinning is a method to produce continuous fibers with a diameter ranging from a few tens of nanometers to a few tens of micrometers. To electrospin fibers, a suitable liquefied material which can be charged may be fed through a small, in most cases electrically conductive nozzle. The liquefied material may be electrically charged by applying a high voltage between the nozzle and a counter electrode. The generated electric field causes a cone-shape deformation of the droplet at the nozzle tip. At a critical electric field, the electrostatic forces at the drop surface, surpasses the liquid surface tension and the liquid starts flowing in the form of a charged thin jet from the nozzle to the counter electrode. During the flight towards the counter electrode the fibrous jet is continuously stretched by the different forces acting on it, reducing its diameter. During this flight the fibrous jet solidifies (by e.g. evaporation of the solvent or cooling of the material) such that a solid fiber is deposited on the collector (which may be placed in the fiber fight path e.g. just before the counter electrode or the counter electrode is used as collector directly).

Electrospinning uses an electric field, generated by a high voltage potential between nozzle and collector, to produce a fiber from a droplet at the nozzle tip. In alternative configurations fibers are drawn e.g. from a liquid bath, liquid covered ball, liquid filled opening or liquid covered wire. The generated electric field and the charged fibrous jet have some adverse effects on its surroundings. When an electrospinning process is run for a certain time, components of the equipment surrounding the fibrous jet path e.g. the machine enclosure may gradually build up a static electric charge. The amount of charge accumulated on the surfaces of the setup and enclosure increases over time as long as the electric field is present (i.e. as long as the electrospinning process is running).

Electric charge changes in the vicinity of the fiber producing process will influence the shape of the electric field and this can cause deviations in the electrospinning process, not exclusively but such as attract or deflect the jet and so changing the path of the electrospinning jet. Among others, this can alter the fiber diameter or the location of fiber deposition. The built up of the static electric charge may vary over different electrospinning runs meaning that the electric charge build up will also vary over different runs. Similar problems may occur in electrospraying devices.

When identical results from different electrospinning or electrospraying runs are required, the accumulated charge on the surrounding equipment is unwanted since the charge accumulation changes initial conditions for each process run. When trying to remove this accumulated charge, by way of cleaning with wipes, or transferring charge via contact, the user will unfortunately also introduce (localized) static charges in the electro hydrodynamic environment/ system, and as such, will not solve the problem.

SUMMARY OF THE INVENTION

One of the objects of the present invention is to provide an electro hydrodynamic production method that will give more uniform results over several process runs.

A first aspect of the invention provides an electro hydrodynamic production method, the method comprising:
- arranging an electro hydrodynamic device inside an enclosure;
- distributing positive and/or negative ions inside the enclosure during a charging period with a certain defined amount of power, wherein the distribution of the positive and/or the negative ions inside the enclosure is performed so that a predefined amount of charge is set on the interior of the enclosure;
- within a predetermined period of time after the charging period has ended, activating the electrospinning device so as to create a product;
- removing the product from the device.

The present invention offers a solution for the problem of non-identical initial process conditions for an electro hydrodynamic process caused by, pre-existing and accumulated, electric charges on the equipment overtime. The method can be used to yield an identical electric charge distribution within the enclosure prior to each electro hydrodynamic process, effectively yielding higher reproducibility due to the predefined and identical initial conditions with respect to charge distribution. It is noted that the charge set on the interior of the enclosure is related to the charge on (non-conducting and/or non-dissipative surfaces of) interior components within the enclosure, such as the inside surfaces of walls of the enclosure. The predefined charge can even act as an electrostatic lens for the electro hydrodynamic production method, even further enhancing a consistent production method.

Optionally, the second, third and fourth step of the method are repeated to create multiple products. In this way, identical products can be produced due to identical initial charge distribution conditions prior to each repetition of an electro hydrodynamic process.

Optionally, the method comprises:
- measuring charge on the electro hydrodynamic device and/or the enclosure, to obtain a charge parameter indicative of a measured charge;

controlling the distribution of the positive and negative ions, using the charge parameter. By measuring the charge on the device and/or on the enclosure, the distribution of charged ions can be accurately controlled to achieve a required accuracy, or speed for applying charging.

Optionally, the method further comprises alternately generating the positive and negative ions. By alternately generating positive and negative ions, the control system is able to neutralize pre-existing positive and negative charges at once.

Optionally, the method comprises the controlling of the generation of positive and negative ions so that the ions are generated during repetitive cycles, wherein a cycle comprises a time period Tp during which positive ions are generated, and a time period Tn during which negative ions are generated.

Optionally, the positive and negative ions are distributed inside the enclosure so as to create a charge Venc on one or more components inside the enclosure, wherein Venc<100 kV or Venc>−100 kV. This range has shown good results wherein the exact voltage may vary to change jet behavior, deposition area, deposition spread area, and/or attract or deflect the jet.

Optionally, the enclosure has a number of walls, at least one of which is made out of electrically non-conductive or non-dissipative material. Walls made out of these materials will be not preferred by the flying fiber (jet) as a collector, i.e. the fiber is less prone to deposit on those walls.

According to a further aspect there is provided an electro hydrodynamic system comprising:
an enclosure;
an electro hydrodynamic device inside the enclosure;
one or more charge producing devices arranged to distribute positive and negative ions in the enclosure, wherein the distribution of the positive and/or the negative ions inside the enclosure is performed so that a predefined amount of charge is set on the interior of the enclosure. The interior of the enclosure e.g. comprises the (non-conducting/non-dissipative) inner surfaces of the enclosure walls.

The device may further comprise a charge controller arranged to control the charge producing devices so as to create a predefined charge level on components within the enclosure before each run. The device may be an electrospinning device or an electro spraying device.

SHORT DESCRIPTION OF DRAWINGS

These and other aspects of the invention are apparent from and will be elucidated with reference to the embodiments described hereinafter. In the drawings, FIG. 1 shows a flow chart of a method of producing a fibrous structure according to an embodiment of the invention;

FIG. 2 schematically shows a perspective view of an embodiment of a system used to perform the described method;

Figure 6:
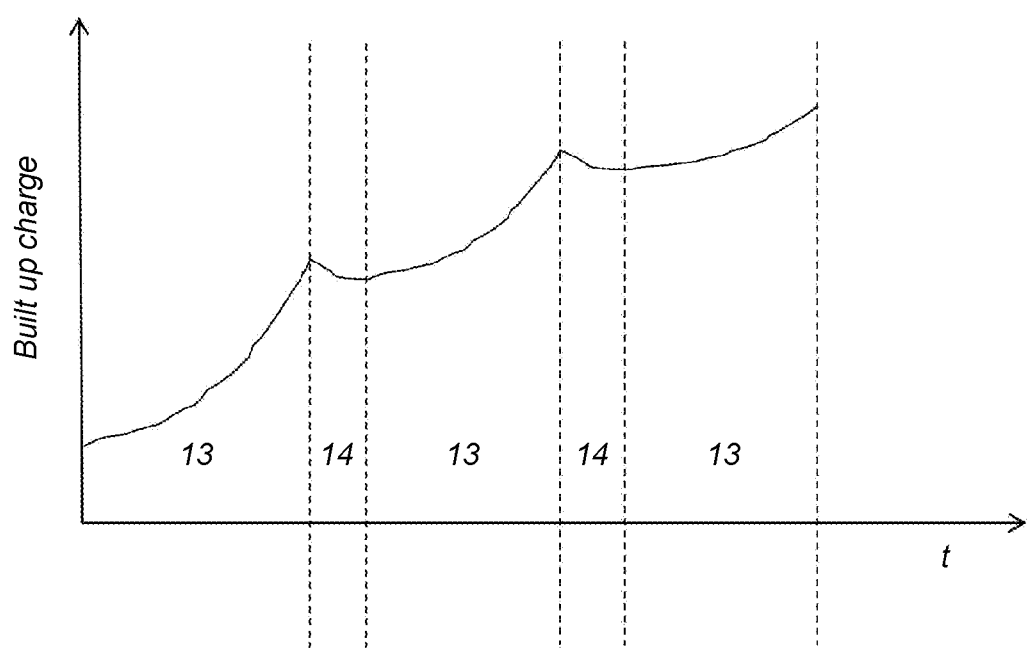

FIG. 5 schematically shows a top view of an electrospinning device arranged within an enclosure according to the prior art, FIG. 6 shows a graph of a possible built up of charge on the walls of the enclosure of FIG. 5, in the situation where the described embodiments are not yet used, FIG. 7 shows a graph of a possible built up of charge on the walls of the enclosure, in the situation where the above described embodiments are used.

It should be noted that items which have the same reference numbers in different Figures, have the same structural features and the same functions, or are the same signals. Where the function and/or structure of such an item has been explained, there is no necessity for repeated explanation thereof in the detailed description.

DESCRIPTION OF EMBODIMENTS

Figure 1:
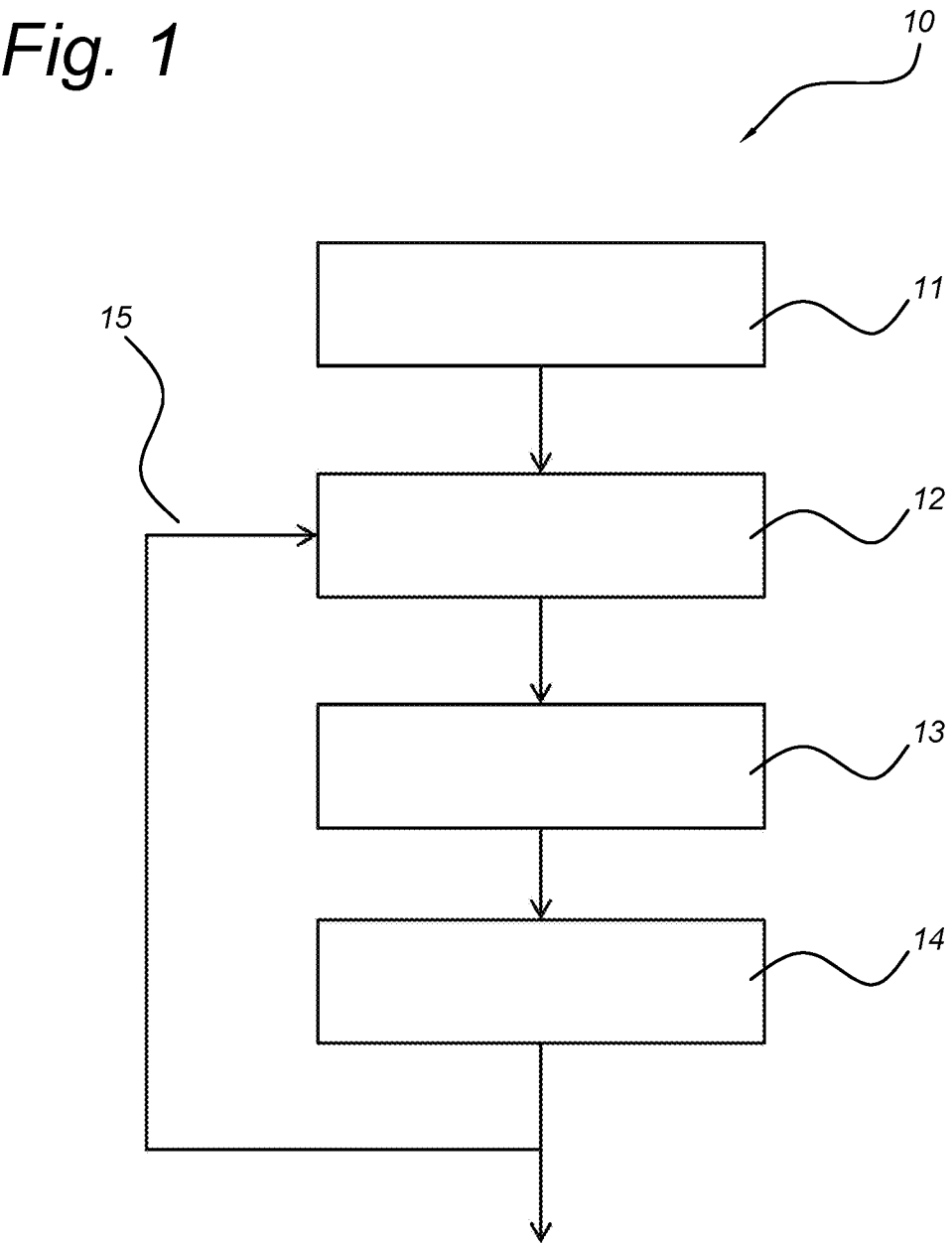

FIG. 1 shows a flow chart of an electro hydrodynamic production method 10 according to an embodiment. In this embodiment, the method comprises a method of producing a fibrous structure using an electrospinning process. The method 10 comprises a step 11 of arranging an electrospinning device inside an enclosure. A next block 12 in FIG. 1 represents a step of distributing positive and/or negative ions inside the enclosure for a certain period of time. When the period of time has lapsed, a step 13 follows wherein the electrospinning device is activated so as to create the fibrous structure. Finally, the created product is removed from the device in a step 14. The steps 12, 13 and 14 can be repeated, see arrow 15, to manufacture multiple products, wherein before each run, the inside of the enclosure is exposed to positive and/or negative ions.

The present invention offers a solution for the problem of non-identical initial process conditions for an electrospinning process caused by pre-existing and accumulated electric charges on the equipment over time. Thanks to the distribution of ions, the accumulated electric charges on the equipment can be homogenized/neutralized/set to a defined charge level. This will result in identical, or almost identical, initial process conditions.

Figure 2:
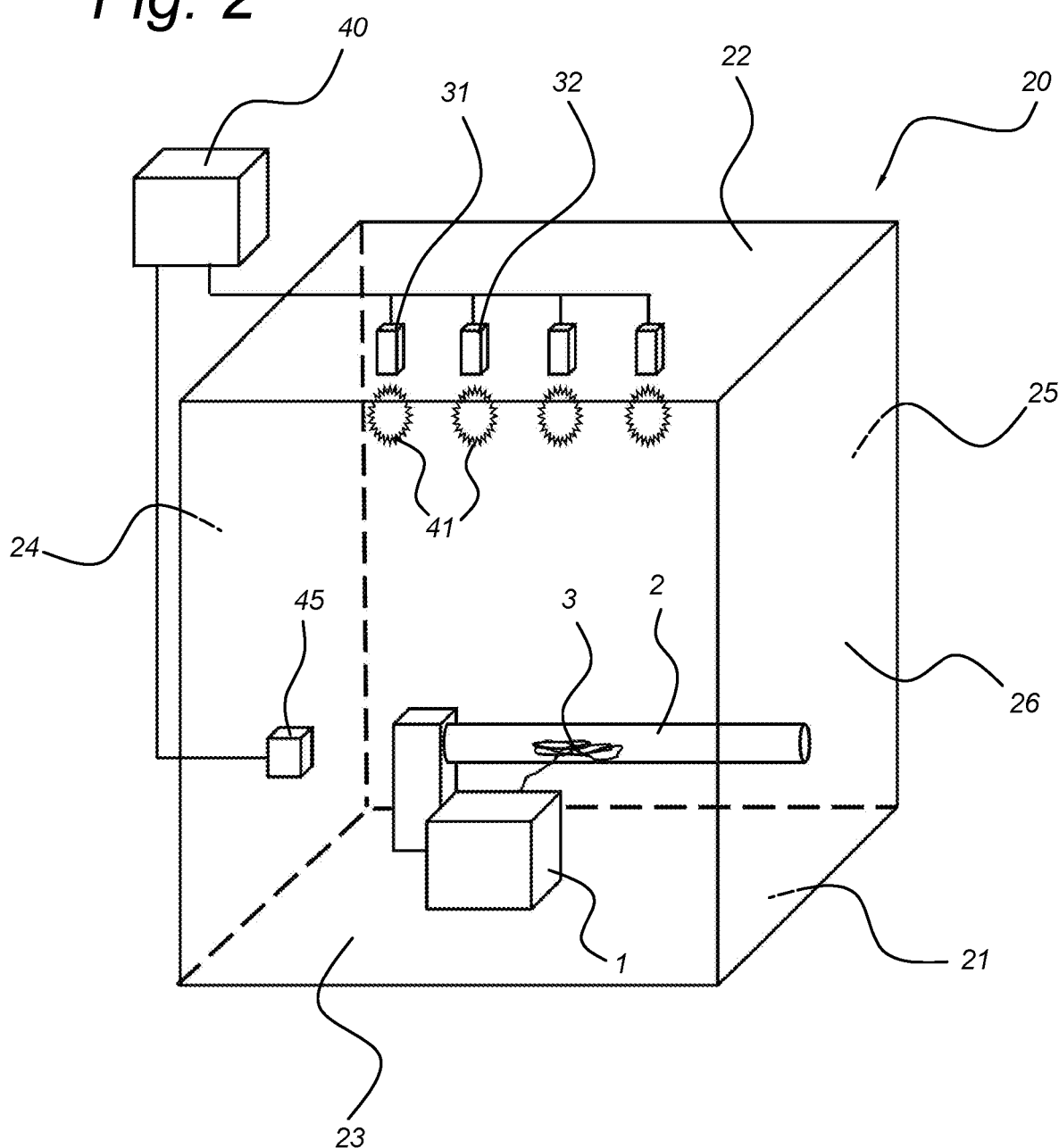

FIG. 2 schematically shows a perspective view of an embodiment of a system used to perform the described method. An electrospinning device is arranged inside an enclosure 20. The electrospinning device may comprises a container 1 for holding a liquid comprising a polymer melt or a polymer solution, and optionally, a nozzle (not visible in FIG. 2) arranged to outlet a stream of the liquid from the container. The electrospinning device further comprises a collector 2 for collecting electro spun material coming from the nozzle during an electrospinning process. A voltage supply system may be arranged to create a voltage difference between at least one nozzle and at least one collector. The voltage supply system may comprise at least one AC or DC high voltage supply to create the voltage difference between at least one nozzle and collector. Due to the applied voltage, an electro spun fiber is created that flies from the nozzle to the collector 2 on which it is collected to form an electro spun fibrous structure 3. In alternative configurations multiple fibers may be formed using multiple nozzles.

In the example of FIG. 2, the enclosure 20 comprises a bottom wall 21, a top wall 22 and four side walls 23, 24, 25, 26. One or more of the walls 21-26 may be transparent, so that a user can monitor the spinning process by looking at the spinning device in the enclosure 20. In an embodiment, at least one side wall is made out of electrically non-conductive or non-dissipative material such as glass, polymers etc. By making at least one of the walls out of electrically non-conductive or non-dissipative material, the risk of unwanted fiber deposition on the walls is reduced. It is noted that conductive or dissipative surfaces introduce the risk of fiber deposition on the particular surface(s). A negative effect is that non-conductive materials have the tendency to accumulate charges over time.

In an embodiment, the system shown in FIG. 2 comprises one or more charge producing devices 31, 32 and a charge controller 40. Each charge producing device 31, 32 may comprise at least one ionisation emitter, capable of producing positive and/or negative ions. Each of the ionisation emitters is controlled by the charge controller 40 which applies a specific power, i.e. a specific voltage, to the emitters. In an embodiment, the charge producing devices 31, 32 are controlled so as to alternately generate positive and negative ions inside the enclosure 20 via their corresponding negative-, positive- or bi-polar ionisation emitters.

By providing positive and negative ions in an alternate way, all components inside the enclosure 20 can be set to a predefined charge level. The components inside the enclosure 20 may include non-conductive and/or non-dissipative surfaces of internal components, including the non-conductive and/or non-dissipative inside walls of the enclosure 20. E.g. the side walls 23-26 shown in FIG. 2 can this be set to a predefined charge level, in effect then acting as a well-defined electrostatic lens for the fluid to also influence the (initial) behaviour of the spinning jet during operation.

Figure 3:
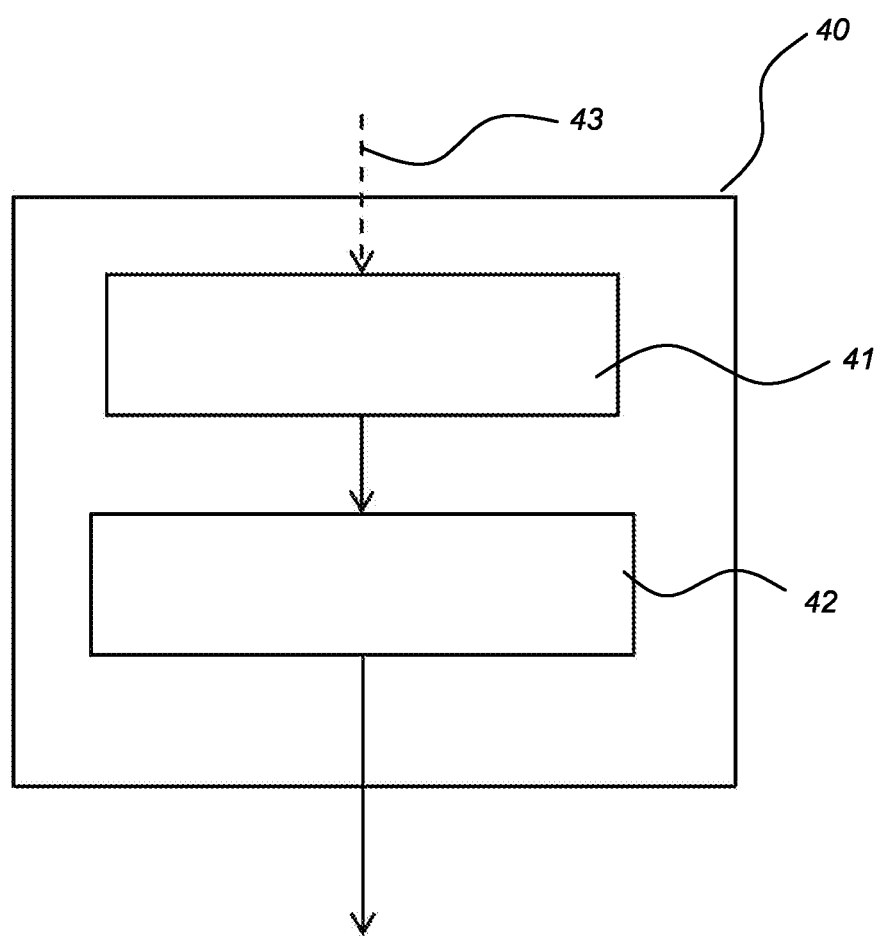
FIG. 3 shows a charge controller according to an embodiment.

FIG. 3 schematically shows the charge controller 40 according to an embodiment. In this embodiment, the charge controller 40 comprises a CPU 41 and a high voltage supply 42. The CPU 41 is arranged to provide settings, such as voltage and timing, to the high voltage supply 42. In an embodiment the CPU 41 is capable of receiving at-least one measurement signal 43 as a feedback signal to set the electrostatic charge of the relevant components in the interior of the enclosure 20 to a predefined level.

In an embodiment, the charge producing devices 31, 32 are controlled such that the positive and negative ions are generated during repetitive cycles, wherein a cycle is divided in a time period Tp during which positive ions are generated, and a time period Tn during which negative ions are generated.

The charge producing device(s) 31, 32 may comprise ionizing emitters controllable by a pulsed DC source. An AC power source is also usable with shifting amplitudes, although this is less effective and will not be elaborated further. When there is a pulsed DC balance between + and −, a certain low level charge close to neutral (e.g. <+/−0.5 kV) on all parts within the enclosure 20 can be generated. In this way the electrospinning jet is (the least) influenced by an electric field other than the one generated by applied voltages on the nozzle and collector.

When the DC balance between + and − ions is altered, the charge producing device 31, 32 can also be used to generate a certain non-neutral charge on all relevant parts within the enclosure 20. Setting a non-neutral initial charge on the interior of the enclosure offers the ability to affect the behavior of the electrospinning process. Normally, the created fiber spirals in an increasing cone-shaped envelope towards the collector 2. The amount of (initial) charge on the surrounding equipment and enclosure affects the size (width, diameter) of this cone/envelope and hence setting the charge to a specific value offers additional control over the process (wider or smaller cone/envelope and hence larger/smaller spread in fiber deposition on collector leading to different traveling and hence stretching and drying).

The closer to the jet flying path, the more effective are the induced charges of the surroundings. In an embodiment, the device also comprises one or more charge sensors 45 (see FIG. 2) which are arranged to measure charge of the adjacent surface(s). Settings of the charge controller 40 controlling the ionisation emitters may be evaluated via measuring charge of the surfaces of interior parts of the enclosure 20 in the vicinity of the expected jet path using the charge sensors 45, and actively steer certain controller settings, such as voltage and duration.

Figure 4A:
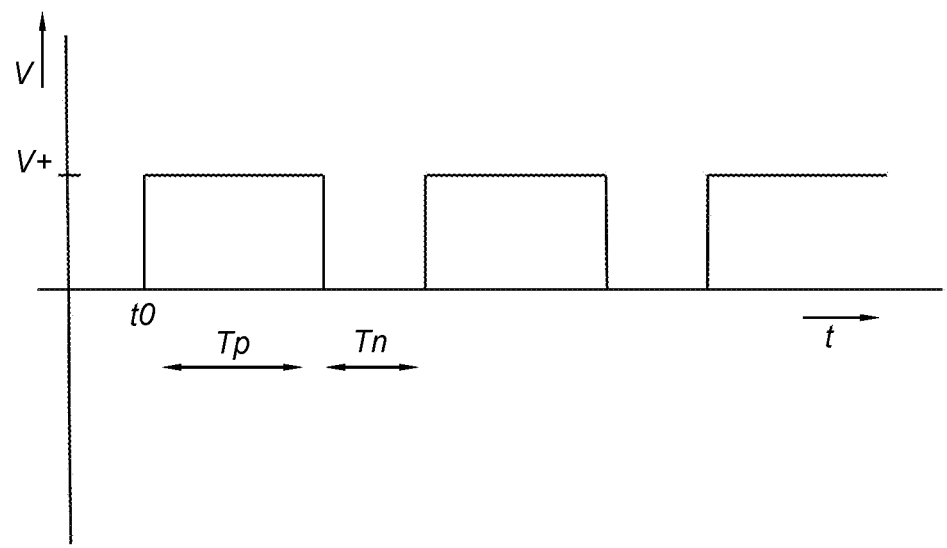
FIGS. 4A and 4B show control signals for controlling the output of the charge producing devices.
Figure 4B:
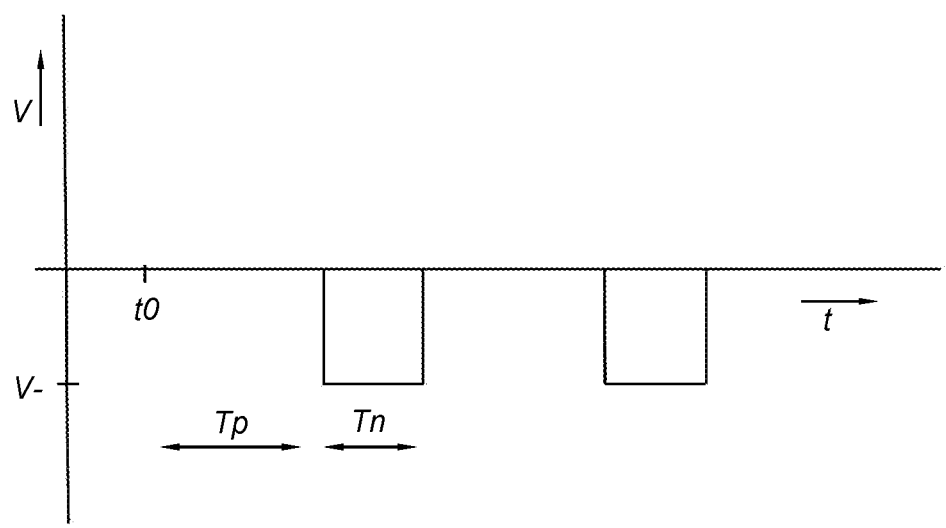

FIGS. 4A and 4B show an example of control signals for controlling the output of the positive ions emitter (FIG. 4A) and the negative ions emitter (FIG. 4B). In this example, more positive ions are created, setting all parts within the enclosure 20 on positive charge before the production process is started. It is noted that in this example the absolute values are equal, so |V+|=|V−| but that Tp>Tn.

In an embodiment, the values for Tp and Tn lie between 0 seconds and a few minutes, preferably between 1 and 30 seconds, e.g. 8 seconds. Preferably, the value of Tp is greater than 1 second and the value for Tn is greater than 1 second. The longer the time periods Tp and Tn, the further the charge producing device will equilibrate the built up charges.

In an embodiment, the amplitudes V+ and V− are determined by the charge controller 40. The amplitudes may be constant during a sequence of DC pulses, by alternatively, they may vary over time. When constant, the absolute value for V+ may be higher than the absolute value for V− so as to generate a positive charge on all parts within the enclosure or to compensate for a general more negative charge build up during step 13.

Balance offset changes the ratio of positive to negative ions. This enables to set all parts within the enclosure to a specific charge, customized to initial starting conditions resulting from the charge build up during step 13.

In an embodiment, the amount of ions is controlled by the charge controller 40. By controlling the balance between negative and positive ions (e.g. 60% positive and 40% negative), it is possible to set all parts within the enclosure most efficiently, fastest, to a specific charge customized dependent on the charge build up during step 13.

In an embodiment, the number of positive or negative ionisation emitters is controlled.

In a further embodiment, the balance of positive vs negative ions is controlled to set all parts/components within the enclosure 20 most efficiently, fastest, to a specific charge customized dependent on the charge build up during step 13.

The frequency between emissions may be controlled by the charge controller 40 to change the pulse duration and voltage resulting in an emission depth (i.e. how far the ion-cloud is effective/reaches).

It is noted that the charge producing devices 31, 32 can be arranged inside the enclosure 20, or outside the enclosure 20 having a channel leading inside the enclosure 20 for exposing the ions. The charge producing devices 31, 32 can be arranged in an array as shown in FIG. 2, but alternatives are possible. When being arranged inside the enclosure 20, the charge producing devices 31, 32 may be arranged anywhere within the enclosure 20 except at a location where they could obstruct the fiber coming from the nozzle and going to the collector 2.

FIG. 5 schematically shows a top view of an electrospinning device arranged within an enclosure 50 according to the prior art. The system shown in FIG. 5 is similar to the embodiment of FIG. 2, but without the charge devices 31, 32. The plus signs shown in FIG. 5 indicate built up charge. This built up charge may influence the spinning process. If the built up charge is sufficient, the spinning process is influenced to such an extent that the width W2 of the fibrous structure, see dashed lines within cone 52, created on the collector 2 is smaller than a width W1 created on the collector 2 during a previous manufacturing session, see cone 51. So, the product of the second run will not be identical to the product of the first run.

FIG. 6 shows a graph of a possible built up of charge on the inner surface of the walls of the enclosure 20, in the situation where the above described embodiments are not yet used. As can be seen from FIG. 6, the charge builds up during a spinning step 13, and slowly decreases during a step 14 where the product is removed from the electrospinning device.

FIG. 7 shows a graph of a possible built up of charge on the inner surface of the walls of the enclosure 20, in the situation where the above described embodiments are used. An unknown initial equipment condition is indicated with reference number 71. In the above described step 12, positive and/or negative ions are distributed inside the enclosure 20 during a charging period with a certain defined amount of power. In this way the device and enclosure are set to constant conditions, prior to the spinning step 13. The optimal amount of created charge is dependent on the amount of charge transferred by the electrospinning process itself to the interior during processing, and may be dependent on the spinning time and the number of nozzles used. In this example, a one nozzle process transfers charge to the interior of the enclosure 20 over time, but the skilled reader will understand that using multiple nozzle processes will induce a different charge transfer.

Within a predetermined period of time after the charging period 12 has ended, the electrospinning device is activated so as to create a product. In the example of FIG. 7, the predetermined period is about 0 seconds, but the period may depend on the circumstances. At the end of the step 12, the charge is at a level 72. This level can be controlled by the suitable controlling of the charge devices 31, 32 and will be constant over several runs if needed.

After step 12, the spinning run 13 starts, where charges increase to a certain uncontrollable level. This level varies depending on process settings, the run duration, the amount of nozzles, etcetera.

In the step 14, the product is removed from the device. As can be seen from FIG. 7, the charge slightly decreases to a level which is also non-controllable. So by again performing the step 12, the charge level is brought back to a known level, being level 72. In FIG. 7, it is indicated by Tp+Tn that both positive and negative ions are used in step 12.

It should be noted that the above-mentioned embodiments illustrate rather than limit the invention, and that those skilled in the art will be able to design many alternative embodiments. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. In the device claims several means are enumerated. These means may be embodied by one and the same item of hardware or software. The mere fact that certain measures are recited in mutually different dependent claims does not indicate that a combination of these measures cannot be used to advantage.

The invention claimed is:

1. An electro hydrodynamic production method, the method comprising:
   arranging an electro hydrodynamic device inside an interior of an enclosure;
   distributing positive and/or negative ions inside the enclosure during a charging period with a certain defined amount of power, wherein the distribution of the positive and/or the negative ions inside the enclosure is performed so that a predefined amount of charge is set on the interior of the enclosure;
   within a predetermined period of time after the charging period has ended, activating the electro hydrodynamic device so as to create a product;
   removing the product from the device.

2. The method according to claim 1, wherein the second, third and fourth step of the method are repeated to create multiple products.

3. The method according to claim 1, wherein the method comprises:
   measuring charge on the electro hydrodynamic device and/or the enclosure, to obtain a charge parameter indicative of a measured charge;
   controlling the distribution of the positive and negative ions, using the charge parameter.

4. The method according to claim 1, wherein the method further comprises alternately generating the positive and negative ions.

5. The method according to claim 4, wherein the method comprises:
   controlling the generation of positive and negative ions so that the ions are generated during repetitive cycles, wherein a cycle comprises a time period Tp during which positive ions are generated, and a time period Tn during which negative ions are generated.

6. The method according to claim 1, wherein the positive and negative ions are distributed inside the enclosure so as to create a charge Venc on one or more components inside the enclosure, wherein Venc <100 kV or Venc >-100 kV.

7. The method according to claim 1, wherein the enclosure has a number of walls, at least one of which is made out of electrically non-conductive or non-dissipative material.

8. An electro hydrodynamic system comprising:
   an enclosure;
   an electro hydrodynamic device inside an interior of the enclosure;
   one or more charge producing devices arranged to distribute positive and/or negative ions in the enclosure, wherein the distribution of the positive and/or the negative ions inside the enclosure is performed so that a predefined amount of charge is set on the interior of the enclosure;
   wherein the electro hydrodynamic device is configured to be activated within a predetermined period of time after the charging period has ended so as to create a product.

9. The electro hydrodynamic system according to claim 8, the device comprising:
   a charge controller arranged to control the charge producing devices so as to create a predefined charge level on components within the enclosure before each run.

* * * * *